March 30, 1965  C. A. GARBER ETAL  3,175,522
MINIMUM TILLAGE PLANTER
Filed Feb. 11, 1963  4 Sheets-Sheet 1
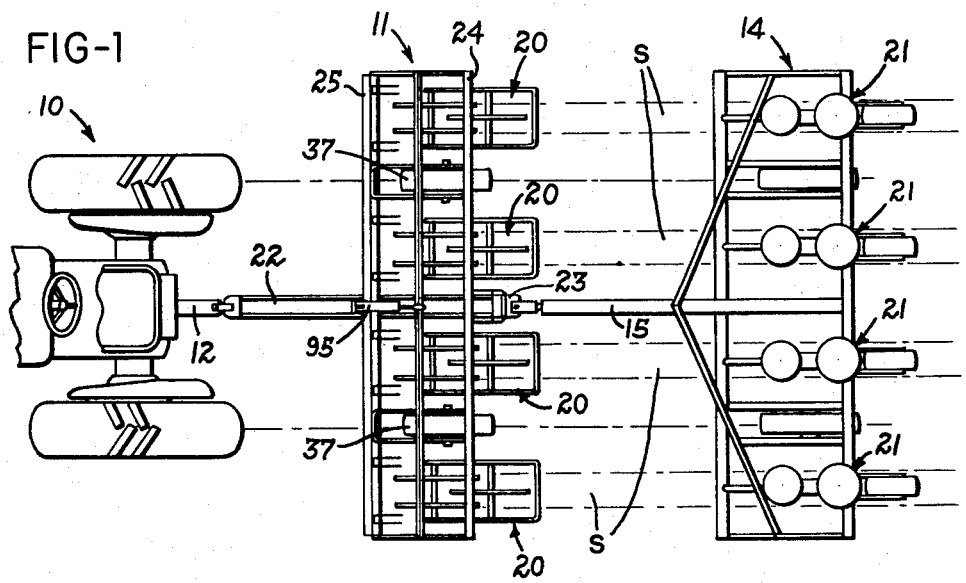
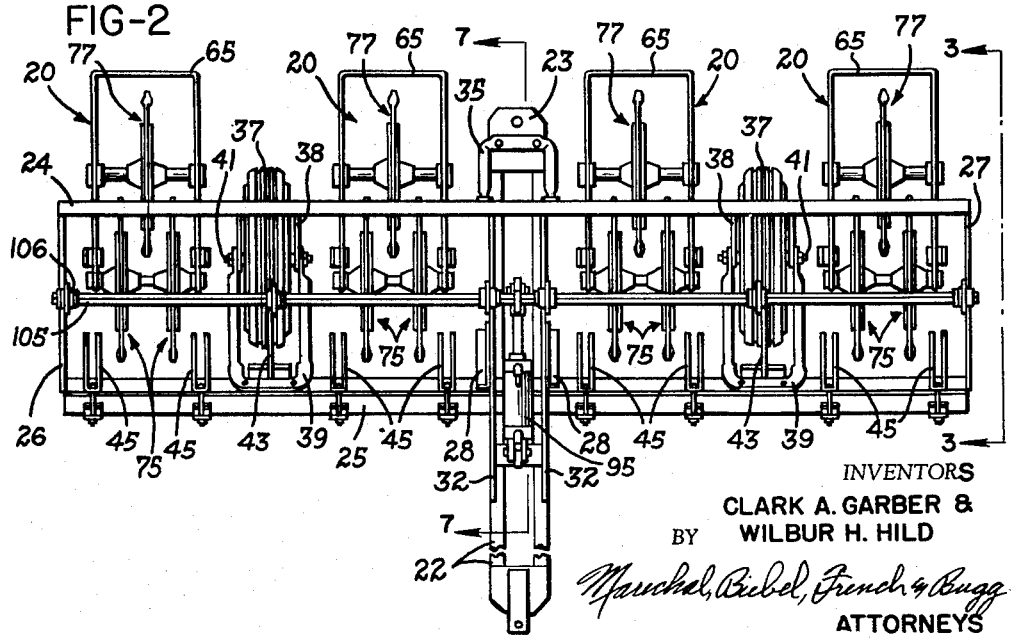
INVENTORS
CLARK A. GARBER &
BY  WILBUR H. HILD
Marechal, Biebel, French & Bugg
ATTORNEYS

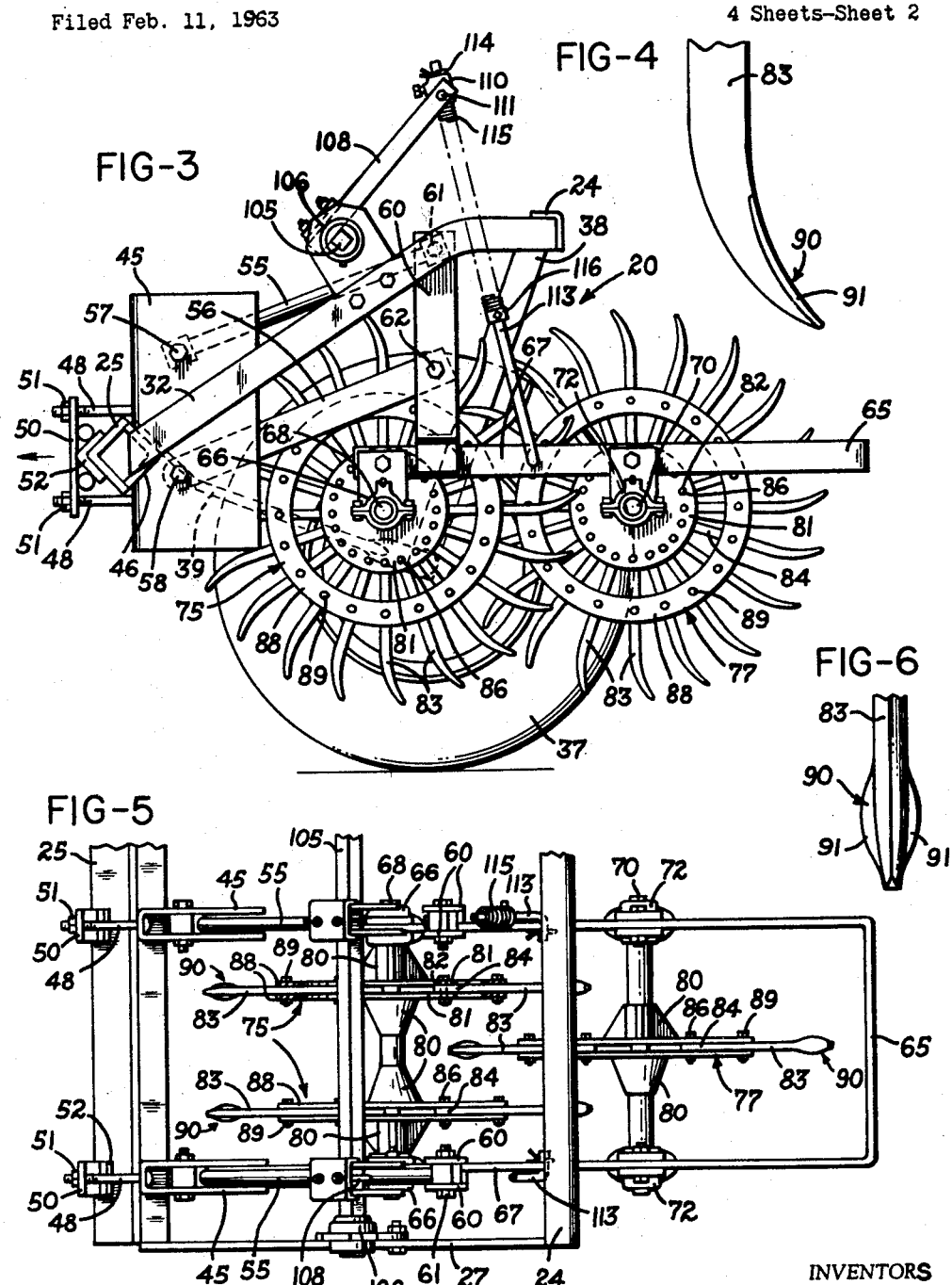

March 30, 1965 C. A. GARBER ETAL 3,175,522
MINIMUM TILLAGE PLANTER
Filed Feb. 11, 1963 4 Sheets-Sheet 3

INVENTORS
CLARK A. GARBER &
BY WILBUR H. HILD
Marechal, Biebel, French & Bugg
ATTORNEYS March 30, 1965    C. A. GARBER ETAL    3,175,522
MINIMUM TILLAGE PLANTER
Filed Feb. 11, 1963    4 Sheets-Sheet 4
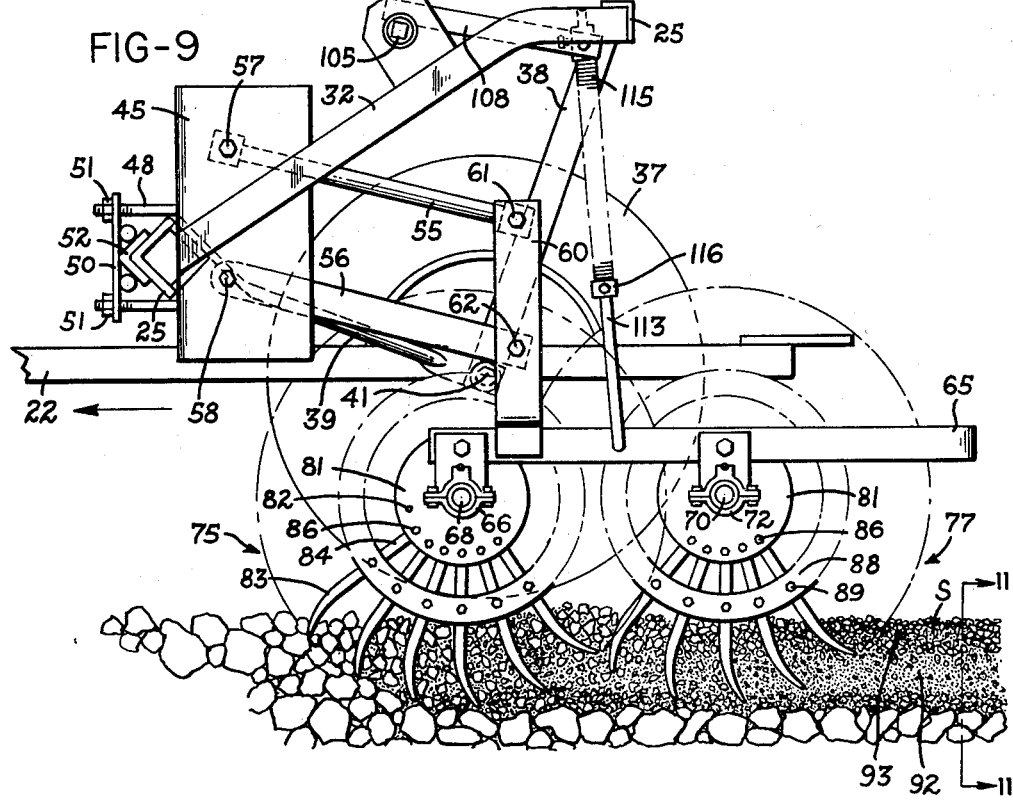
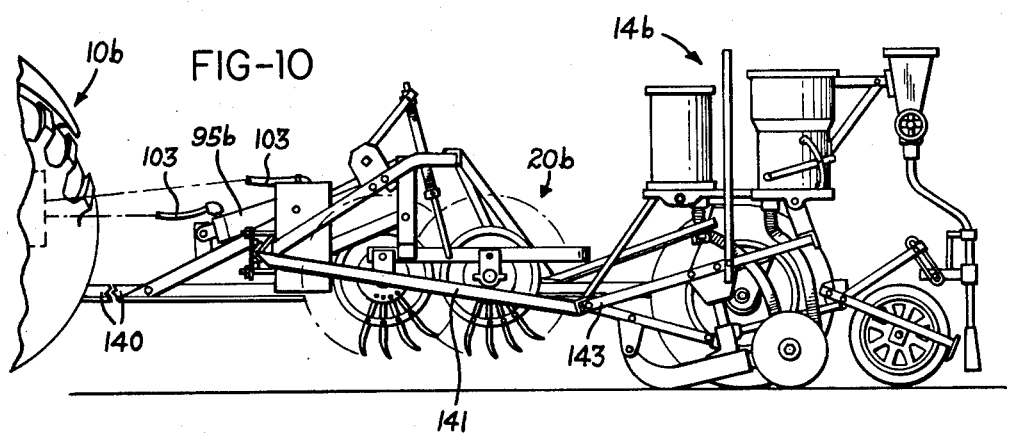
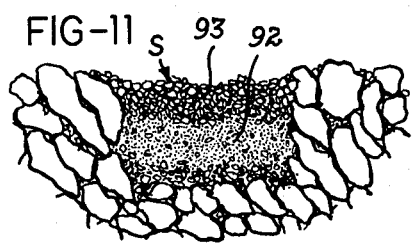
*INVENTORS*
CLARK A. GARBER &
BY WILBUR H. HILD
*Marshall, Biebel, French & Bugg*
ATTORNEYS

United States Patent Office 3,175,522
Patented Mar. 30, 1965

3,175,522
MINIMUM TILLAGE PLANTER
Clark Armstrong Garber and Wilbur Henry Hild, Saint Paris, Ohio, assignors to Garber Seeders, Inc., Saint Paris, Ohio, a corporation of Ohio
Filed Feb. 11, 1963, Ser. No. 257,696
7 Claims. (Cl. 111—61)

The invention relates to apparatus and a process for planting corn and the like.

In particular, this invention relates to an improvement in the planting of corn which creates an earth environment wherein the seed will germinate and grow with improved vigor. To achieve this improved growing the soil is prepared in such a manner that the seed is closely surrounded by finely pulverized earth particles so that moist earth is in intimate contact therewith. Around and above the seed and fine earth particles are larger clods of dirt which permit small open spaces therebetween for improving aeration of and moisture flow to the fine earth particles and the seed, as well as improved root growth.

The present practice in planting seed corn usually involves three completely separate steps or operations, including first plowing the field in the usual manner, then cultivating this entire field by pulling a disk harrow or the like thereover, and then subsequently planting the seed corn. These cultivators either break the soil into small clods which are not suitable for initial seed germination, or completely pulverize or powder the earth causing the soil to become packed very hard by the first hard rain so that aeration and moisturization of the seed is greatly decreased and there is increased resistance to root growth.

Accordingly, an important object of the invention is to provide a process and apparatus for preparing soil to receive corn seed so that the seed is deposited in an environment of fine earth particles surrounded by larger earth clods for improved germination and growing of the seed.

Another object of the invention is to provide a strip processing unit of the aforesaid type which operates in roughly plowed ground to prepare a plurality of spaced parallel strips for receiving the seeds while leaving the area between the rows in the roughly plowed state for improved soil aeration and root growth, and particularly to provide apparatus of this type which has road wheels and mechanism for advancing and retracting the operating components of the processing unit so that it can be moved over smooth surfaces without damage to the unit.

A further object of this invention is to provide apparatus of the aforesaid type which can be mounted on a tractor tool bar or a corn planter, and in particular is simple in design and dependable in operation so that both the initial cost and maintenance expenses connected therewith are held to a minimum.

Another object of this invention is to provide a process for planting and growing corn or the like which enables the seed to germinate at a faster rate, and further enables the corn plant and its roots to penetrate the ground and receive moisture in an improved manner, and particularly to provide a process for planting corn seed which requires only a portion of the time that is consumed by the most commonly used present day processes.

Other objects and advantages of the invention will be apparent from the following description, the accompanying drawings and the appended claims.

In the drawings:

FIG. 1 is a plan view of an equipment train including a strip processing unit in accordance with the invention;

FIG. 2 is a plan view of the strip processing unit with the operating mechanism partially removed to better illustrate portions thereof;

FIG. 3 is a side elevation view taken essentially along the line 3—3 of FIG. 1 and illustrating the tillage units in the raised position;

FIG. 4 is a side view of one of the fingers on the tillage wheels;

FIG. 5 is a plan view of the end tillage unit shown in FIG. 3;

FIG. 6 is an end view of the tillage wheel fingers looking from left to right in FIG. 4;

FIG. 9 is a side view of the embodiment of FIG. 3 but showing the mechanism in the lowered or operative position;

FIG. 10 is a side view of a further embodiment of the invention wherein the strip processing unit is supported between a tractor and a corn planter; and FIG. 11 is a sectional view of the processed strip taken essentially along the line 11—11 of FIG. 9.

Figure 7:
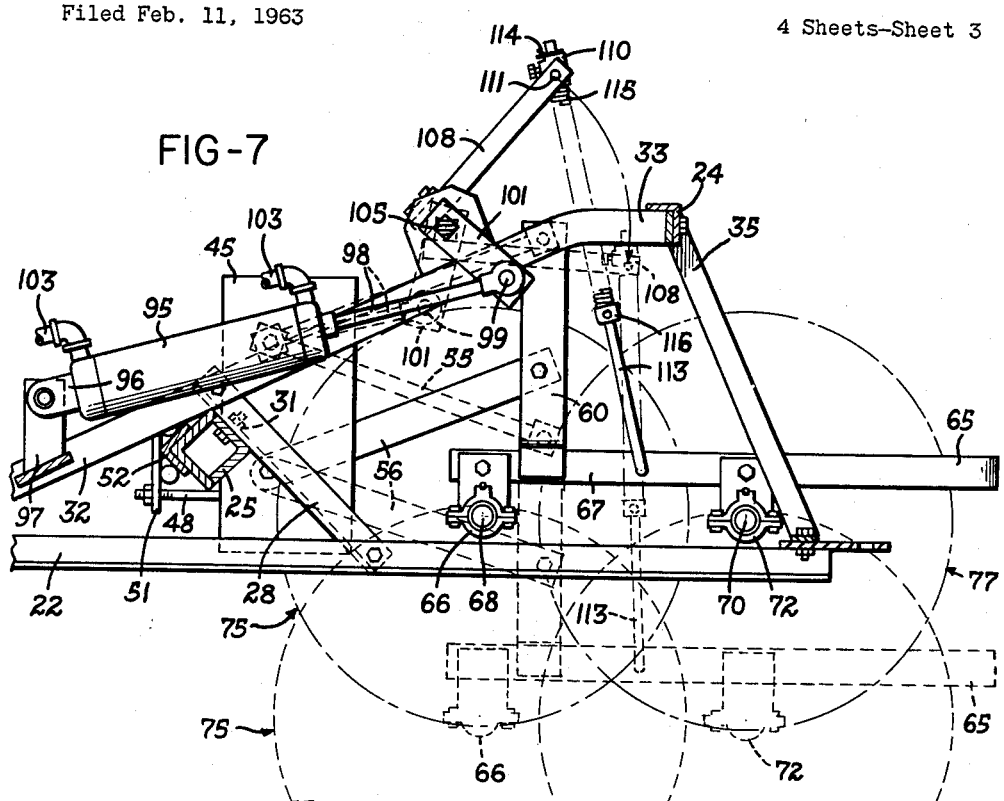
FIG. 7 is a sectional view taken essentially along the line 7—7 of FIG. 2 and illustrating the raising and lowering mechanism.

Referring to the drawings wherein preferred embodiments of the invention are shown, FIG. 1 illustrates an equipment train including a conventional farm tractor 10 having the strip processor 11 secured thereto by the draw bar 12, and the conventional corn planter 14 is similarly connected to the processor 11 by another draw bar 15. This equipment train is capable of planting corn in a roughly plowed field with increased efficiency and in an improved manner as will be described. The strip processor 11 includes four individual tillage units 20 each of which prepares a strip S of the ground and is aligned with a planting unit 21 of the corn planter 14. The carriage on which the tillage units are mounted comprises an elongated central support member 22, one end of which is connected to the tractor draw bar 12 while the opposite end has hitch apparatus 23 for connecting to the draw bar 15 of the corn planter 14.

A rectangular supporting frame is rigidly secured to the central support member 22 and, as seen in FIGS. 2–7, this frame includes a main support angle 24 and a parallel tool bar 25 which have their ends rigidly interconnected by the end members 26 and 27. The tool bar 25 is secured to the parallel frame members 28 (FIGS. 2 and 7) by the bolts 31, and the members 28 are bolted at one end to the member 22 and at the other end to the cylinder support rack 32. The rack 32 extends upwardly at an acute angle from a connection on the main support member 22 to a rigid connection with the center portion of the main support angle 24, and at this point, both the upper end 33 of the rack 32 and the support angle 24 are firmly held in place by the U-shaped brace 35 which projects upwardly from the central support member 22 and is bolted to the angle 24. Thus the support member 22, the rectangular frame 24–27, the frame members 28, the rack 32, and the brace 35 form a rigid carriage or framework on which the operative components of the strip processor are mounted.

As shown in FIGS. 2 and 9, the road wheels 37 are each supported rigidly between the main angle 24 and the tool bar 25 by the U-shaped frame elements 38 and 39 which project downwardly from the main support angle 24 and tool bar 25, respectively, and support the axles 41 on which the wheels 37 are mounted for rotation. The rectangular frame 24–27 is reinforced immediately above each of the wheels 37 by the braces 43 which are rigidly connected to the angle 24 and tool bar 25 to add strength and rigidity in these areas.

Each of the tillage units 20 is essentially identical so that only one is described in detail. As shown in FIGS. 2, 3, and 5, a unit 20 includes two U-shaped mounting brackets 45 which are notched at 46 (FIG. 3) and are clamped to the tool bar 25 by the bolts 48 which pass above and below the bar 25 and through suitable holes in the plate 50 and receive the nuts 51. The plate 50 has welded thereon a V-shaped alignment block 52 which prevents slippage or relative movement between the bracket 45 and the tool bar 25 when they are properly secured together.

Each U-shaped bracket 45 has an upper and lower support bar 55 and 56 pivotally secured thereto by the pins 57 and 58, respectively. The opposite ends of these bars are similarly connected to the vertical members 60 by the pins 61 and 62 so that a parallelogram is defined thereby, and the bars 55 and 56 thus prohibit angular movement of the units 20 with respect to the surface of the ground.

The U-shaped tiller wheel support 65 (FIG. 5) is welded on the lower ends of each pair of vertical members 60 so that as the members 60 move in a vertical direction the support 65 will be similarly moved. The support bearings 66 are suitably secured on the forward ends 67 of the wheel support 65 for supporting the opposite ends of the axle 68. In a similar manner, the rear axle 70 is supported near the center of the wheel support 65 by the bearing members 72 so that the axles 68 and 70 are disposed parallel to one another and spaced apart a predetermined distance.

A pair of tillage wheels 75 are supported on the forward axle 68 in precise axial relation and a third tillage wheel 77 is secured to a center portion of the rear axle 70, as shown in FIG. 5, so that it is spaced midway between the front pair of wheels 75 and the spacing between the axles 68 and 70 provides substantial radial overlap between the tillage wheels.

Each of the tillage wheels 75 or 77 includes a pair of hubs 80, each of which has a flange 81 formed integrally therewith and having a plurality of bores 82 around the outer periphery thereof. The radially extending fingers 83, preferably constructed from cast iron or other hard durable material, have their inner ends 84 clamped between the flanges 81 and bolts or rivets 86 extending through each of the members 81 and 83. The fingers 83 are locked in place against movement by the rings 88 which are secured on both sides of the fingers near the central portion thereof by rivets or the like 89. The tillage wheels 75 and 77 freely rotate on their axles 68 and 70 so that contact with the ground causes each of these tillage wheels to rotate, e.g., in a clockwise direction as shown in FIGS. 3 and 9.

The fingers 83 are forced into the ground by the weight of the carriage and associated apparatus, and their penetration is limited by the tires 37 which will ride on the surface of the ground when the fingers penetrate to the prescribed depth, as will be explained. In especially hard ground, it may be necessary to add to the weight of the carriage in order to obtain the desired penetration, and this can be accomplished by placing weight, such as concrete blocks, on the main support member 22.

As shown in FIGS. 4 and 6, the outer ends or teeth 90 of the fingers 83 taper to a point and are curved in the direction of rotation of the associated wheel to facilitate passage of the fingers into the earth. The ends 90 have the integral flared surfaces 91 formed thereon which are flared in a direction axially of the wheel so that, as shown in FIGS. 9 and 11, the fingers initially penetrate and break the large earth clods into smaller earth clods and fine earth particles. As the fingers 83 move upwardly they flip the smaller clods toward the surface while the fine earth particles are allowed to sift downwardly to form a germination layer 92 of these fine earth particles covered by the layer 93 of small earth clods. A churning action also takes place in the center portion of the strip in the areas wherein the tillage wheels 75 and 77 overlap so that the segregation of size is especially effective in this area where the seed will be deposited.

It should be understood that in the reference to large and small earth clods, fine earth particles, and layer of each, there is no precise segregation of these sizes but rather a substantial majority of fine earth particles in the germination layer 92, and a substantial majority of smaller earth clods surrounding this germination layer. Moreover, the center of the germination layer 93 contains a much larger percentage of fine particles than does the outlying portions of this layer.

The actuating mechanism for raising and lowering the tillage units 20 is shown best in FIGS. 2 and 7, and includes a hydraulic cylinder 95 having one end 96 pivotally mounted on the bracket 97 which is welded to the rack 32, and its piston rod 98 is coupled by the pivot pin 99 to the crank arm 101. Actuation of the cylinder 95 is controlled from a valve, not shown, mounted on the tractor 10 for controlling the flow of hydraulic fluid from a tractor driven pump through the flexible conduits 103 which lead to the chambers on opposite sides of the piston of the cylinder 95 in the usual manner.

The crank arm 101 is rigidly secured to the square cross shaft 105 which extends the entire width of the strip processor 11 and is journaled in the bearings 106 mounted on the end members 26 and 27, the brace members 43, and the cylinder support rack 32. The lever arms 108 are appropriately mounted on the cross shaft 105 above each of the forward portions 67 of the wheel support frame 65, and a sleeve 110 is secured at the opposite end of each arm by the pivot pins 111. The operating rods 113 extend through the sleeves 110 and have pins 114 through the upper end thereof so that counterclockwise rotation of the shaft 105 and levers 108, as viewed in FIG. 3, will impart a raising movement to each of the rods 113.

Since the rods 113 are pivotally connected to each side of the wheel support braces 65 at a point between the bearings 68 and 70, upward movement of the rods 113 raises the tillage units 20. Thus appropriate rotation of the cross shaft 105 by the actuator cylinder 95 will effect the raising or lowering of each of the tillage units 20. To absorb shock when the units 20 are in their lowered or operating positions the springs 115 are provided around the rods 113 between the sleeve 110 and the collar 116 and urge the rods 113 to the extended position as shown. However, when the tillage units strike a rock or other hard object, the rods are forced upwardly causing the springs 115 to be compressed as the rods 113 slide through the sleeve 110 and, when this unusual stress is relieved, the springs return the rods 113 and the units 20 to their operating position.

In operation, the strip processor 11 and corn planter 14 are pulled by the tractor 10 to the roughly plowed field wherein the corn is to be planted. During travel to the field the processor 11 is in its inoperative or raised position wherein the tillage units 20 are raised, as shown in FIG. 3, so that the tires 37 support the equipment. However, when the corn planting is commenced, the operating valve on the tractor 10 is positioned to cause the piston rod 98 to be drawn into the cylinder 95 thus lowering the units 20 to a point wherein they support the weight of the entire frame and are consequently forced into the ground as the processor 11 is pulled. In this lowered position, the fingers 83 of the units 20 are below the running level of the tires 37 by a predetermined distance, and when these fingers penetrate the surface of the ground to this predetermined distance, the tires 37 once again ride on the ground surface thus preventing the tillage wheels 75 and 77 from penetrating below the prescribed depth.

It is understood that the earth has been previously plowed in the usual manner but not harrowed, disked, or otherwise broken into smaller particles as is customary. Then the strip processor 11 is pulled over this roughly plowed field and four parallel strips S of the ground are automatically prepared for receiving the seed. The three tillage wheels 75 and 77 of each unit 20 cooperate to prepare only a strip of ground in which seed will be planted so that the plowed earth between the strips remains undisturbed thus facilitating aeration of this soil, as well as improved root growth. In the strips S, the fingers 83 of each tillage wheels 75 and 77 penetrate the soil breaking up the large clods created by the plowing thereby eliminating large air pockets below the surface and in the area where the seed will be planted.

As the flared ends 91 of these fingers 83 begin their upward angular movement from the lowest point of penetration, they throw the coarser soil particles to the surface and permit finer particles to shift downwardly to the germination layer 92 wherein the seed will be deposited so that the seed is completely surrounded by fine earth particles, as well as surrounded and covered by a layer 93 of smaller earth clods which facilitate flow of air and moisture to the germination area. In the area wherein the pair of leading wheels 75 overlap with the trailing wheel 77 the above described operation is performed by the churning action created in this area to effect disintegration of the larger clods. Preferred results have been obtained by using wheels which are 26 inches in diameter with the leading wheels spaced 8 inches apart, and pulled at a speed of 4 m.p.h. with the tillage wheels penetrating to a depth of 6 inches to 7 inches. These conditions create optimum sorting of the soil to create the germination layer 92 of fine soil particles at a depth of 2 to 3 inches which has the seed corn deposited in substantially the horizontal and vertical center by the planter 14.

Figure 8:
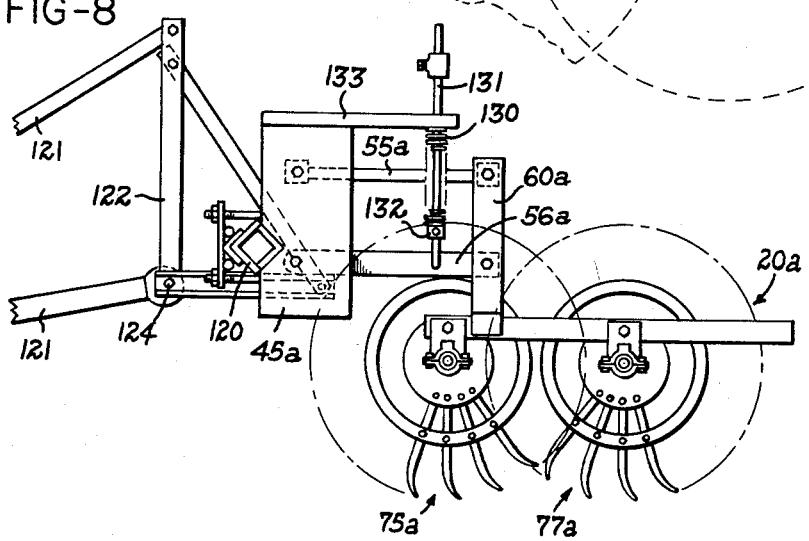
FIG. 8 is a side view of another embodiment of the invention.

Another embodiment of the invention is shown in FIG. 8 wherein the tillage units 20a are secured to the tool bar 120 which is secured in a conventional manner to the rear end of a tractor, not shown. That is, the links 121 which support the vertical member 122 are secured to a tractor in such a manner that the member 122 may be pivoted about the pin 124 to raise the tool bar 120. The tillage units 20a are secured to the tool bar 120 by use of the U-shaped bracket 45a having one end of the parallel mounting arms 55a and 56a pivotally secured thereto. The other ends of these arms are pivotally secured to the vertical member 60a to form a parallelogram. When the tillage wheels 75a and 77a engage hard objects, such as large rocks and the like, they will move in a vertical plane as controlled by the arms 56a and 57a, and the shock absorbing spring 130 will return the unit 20a to the operating position. The spring 130 surrounds the rod 131 between the collar 132 and the rigid mounting plate 133, and the rod 131 is securely connected to the arm 56a so that upper movement of this arm tends to compress the springs 130 which subsequently return the arms 56a to the lowered position.

Thus it should be apparent that this embodiment is generally similar in operation to that described above and that the mounting mechanism merely provides another expedient for moving the tillage units between their raised and lowered positions. When it is desired to raise the tillage unit 20a from the position shown in FIG. 8, the tractor mechanism is operated to pivot the vertical member 122 causing the tool bar 120 and the tillage unit to pivot about the pin 124 and be raised above the surface of the ground.

The embodiment shown in FIG. 10 is also quite similar to the embodiment shown in FIGS. 1 and 2 but does not utilize the tires 37 for raising the unit above the ground for movement in areas remote from the corn field. The strip processor thus is supported on one side by the tow bar 140 of the tractor 10b, and the corn planter 14b by use of the parallel side members 141 which extend rearwardly from the tool bar 25b to rigid connections with the frame members 143 of the corn planter 14b. In all the respects, this unit is substantially identical to the FIG. 2 embodiment, and the tillage units 20b are moved between their operative positions by the cylinder 95b in the manner described hereinabove.

Each of the three disclosed embodiments of the invention are preferably operated in combination with a corn planter so that the seeds will be properly deposited in the processed strips S. Thus, when the corn planter units are secured to the processor 11 the problem of proper alignment can be easily eliminated so that the seed corn is deposited at the proper depth and midway between the lateral edges of the strips. This combination also limits the time and expense required to plant a field since only two separate operations must be performed on the field, to wit, the plowing operation and the processing-planting operation.

The processor units 20 can be used individually with other mounting structures or they can be ganged together as shown in the embodiment of FIG. 1. While the three disclosed mounting structures are preferred, it is within the scope of the invention to utilize the tillage units 20 with other and different mounting apparatus, so long as this apparatus is capable of positioning the units so that the tillage wheels 75 and 77 cooperate with the soil in substantially the manner described above.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described for preparing roughly plowed soil to receive seed comprising, a mounting frame which includes an elongated central support adapted to be secured to a prime mover, a first transverse frame member secured rigidly on said central support and extending the entire width of the apparatus, a second transverse member rigidly secured to said central support parallel and coextensive with said first transverse member, end members secured to the opposite ends of said parallel frame members to define the ends of a rectangular frame, a plurality of tillage units supported on said frame in spaced relationship corresponding to the rows being planted, wheel support frames on said rectangular frame secured rigidly on either side of said central support between said units and in the spaced relationship corresponding to the area between the rows to be planted, a road wheel rotatably mounted in each of said frames for supporting the apparatus for movement across a smooth surface, each said unit including a support bracket having a plurality of cooperating tillage wheels supported thereon for rotation in the direction of travel for preparing the roughly plowed ground with an uncompacted layer of fine earth particles at a depth below the surface of the ground corresponding to the planting depth of the seed, a vertical actuator member extending upwardly from said support bracket on opposite sides of each said tillage units, a pivot bracket secured to said first transverse member in alignment with each of said actuator members, parallel arms pivotally interconnecting each said pivot bracket and vertical member for restricting movement of said support brackets to a vertical direction, an actuator rod coextensive and parallel with said frame members pivotally secured to each of said central support and said end members, arm means on said rod disposed above and connected to each of said units for raising and lowering the units with respect to said frame when said rod is rotated so that the lowermost peripheries of said tillage wheels are moved above and below the lowermost surface of said road wheels, and means for pulling said main support member over the roughly plowed soil.

2. Apparatus of the character described for preparing a seed bed and planting to receive seed comprising, a mounting frame which includes an elongated central support adapted to have one end secured and supported by a prime mover, the other end of said central support adapted to be mounted on a planting device for support a predetermined distance above the ground, a first transverse frame member secured rigidly on said central support and extending the entire width of the apparatus, a second transverse member rigidly secured to said central support parallel and coextensive with said first transverse member, end members secured to the opposite ends of said parallel frame members to define the ends of a rectangular frame, a plurality of tillage units supported on said frame in spaced relationship corresponding to the rows being planted, each said unit including a support bracket having a plurality of cooperating tillage wheels supported thereon for rotation in the direction of travel for preparing the roughly plowed ground with an uncompacted layer of fine earth particles at a depth below the surface of the ground corresponding to the planting depth of the seed, a vertical actuator member extending upwardly from said support bracket on opposite sides of each said tillage unit, a pivot bracket secured to said first transverse member in alignment with each of said actuator members, parallel arms pivotally interconnecting each said pivot bracket and vertical member for restricting movement of said support brackets to a vertical direction, an actuator rod coextensive with said frame members pivotally secured to each of said central support and said end members, and arm means on said rod disposed above and connected to each of said units for raising and lowering the units with respect to said frame when said rod is rotated so that the lowermost peripheries of said tillage wheels are moved between operative and inoperative positions.

3. Apparatus of the character described for preparing narrow seed bed strips of predetermined width spaced apart by undisturbed strips of the roughly plowed ground, comprising a plurality of tillage units secured to a frame, each said unit including a carriage, a plurality of cooperating tillage wheels approximately 26 inches in diameter mounted on each said carriage including a pair of coaxial tillage wheels mounted for rotation on said carriage in direction of travel of said carriage and being spaced apart approximately 8 inches, a third tillage wheel substantially identical to said coaxial tillage wheels mounted on said carriage spaced midway between said coaxial wheels for rotation on an axis parallel to the axis of said coaxial tillage wheels, said axes being spaced horizontally apart a distance slightly greater than the radius of said wheels so that said third wheel overlaps and cooperates with said coaxial tillage wheels, each said tillage wheel including about 20 outwardly extending relatively thin fingers having the outermost end portions curved in the direction of rotation of said units and having a transversely flared flat surface on the concave side of said end portions, said frame regulating the penetration of said fingers into the earth to about 6–7 inches, said fingers and said flat surfaces cooperating to break large earth clods into smaller earth clods and fine earth particles and for segregating the fine earth particles into a clearly defined germination layer of predetermined width and thickness below the surface of the ground in the space wherein the seed corn is to be planted with such germination layer being covered by a covering layer of the smaller earth clods for maximum germination and moisturization of the germanium layer, and means for pulling said carriages over roughly plowed ground.

4. Apparatus as defined in claim 3 wherein said tillage units are secured to a common frame, and means on said frame for raising and lowering said tillage units between an operative position and a stored position for transportation.

5. Apparatus as defined in claim 4 wherein each of said tillage units is individually movable with respect to said common frame so that said tillage units ride smoothly over rough ground when in said operative position.

6. Apparatus as defined in claim 4 wherein wheels are provided on said common frame to support said frame when said tillage units are in said stored position.

7. Apparatus as defined in claim 4 wherein said common frame is supported above the ground between a prime mover and a seeding device.

References Cited by the Examiner

UNITED STATES PATENTS

| | | | |
|---|---|---|---|
| Re. 25,237 | 9/62 | Heeren | 111—1 X |
| 2,028,365 | 1/36 | Wangelin | 172—556 |
| 2,593,679 | 4/52 | Kaupe | 172—464 |
| 3,037,470 | 6/62 | Watson et al. | 111—1 X |
| 3,052,306 | 9/62 | Lynch | 172—177 X |
| 3,086,598 | 4/63 | Gellner | 172—316 X |
| 3,110,275 | 11/63 | Bonney | 111—1 |

OTHER REFERENCES

"Publication," Farm Implement and Machinery Review, Oct. 1, 1957, vol. 83, No. 990, page 882.

T. GRAHAM CRAVER, *Primary Examiner.*

WILLIAM A. SMITH III, *Examiner.*